April 4, 1950 W. M. HOFFMAN 2,502,845
LINE GUIDE ELEMENT FOR FISHING RODS AND THE LIKE
Filed July 21, 1947

INVENTOR.
William M. Hoffman,
BY George L. Richards,
Attorney

Patented Apr. 4, 1950

2,502,845

UNITED STATES PATENT OFFICE 2,502,845

LINE GUIDE ELEMENT FOR FISHING RODS
AND THE LIKE

William M. Hoffman, Newark, N. J.

Application July 21, 1947, Serial No. 762,269

2 Claims. (Cl. 43—24)

This invention relates to an improved construction of line guide element for use on fishing rods and for other appropriate or analogous uses.

The invention has for an object to provide a novel construction of all metal line guide element comprising an assembly of parts joined and interlocked together in such novel manner that necessity for employment of soldering, brazing or welding materials and operations is eliminated, and yet an exceedingly strong and practically unbreakable structure is assured.

The invention has for another object to provide an all metal line guide element which is free from sharp edges, the presence of which would involve risk of abrading a line moved therethrough with weakening effect thereupon and resultant risk of breaking.

A further object of the invention is to provide a line guide element comprising a minimum number of parts, each part being itself of novel form whereby it is individually reenforced against distortion, and said parts, when assembled, being so related and joined as to mutually reenforce each other against relative displacement, distortion or breakage.

Other objects of the invention, not at this time more particularly enumerated, will be understood from the following detailed description of the same.

An illustrative embodiment of this invention is shown in the accompanying drawings, in which.

Similar characters of reference are employed in the above described views, to indicate corresponding parts.

Figure 1:
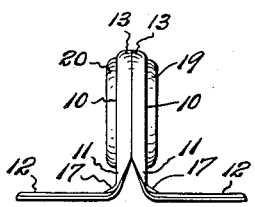
Fig. 1 is a side elevational view.
Figure 2:
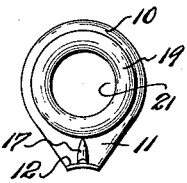
Fig. 2 is an end elevational view.

Referring to the drawings, the novel line guide element includes a pair of upstanding perforate plates 10 of generally circular shape. Each plate 10 is provided at its lower side with a tapered leg extension 11 which terminates in a longitudinally outward and substantially right angularly extending foot piece 12. Each plate 10 is provided around its external periphery with an inwardly projecting annular flange 13 angular to the plane thereof. Said flange 13 is discontinuous so as to terminate at its respective ends in tapering flange extensions 14 which border the margins of the leg extension 11, and which merge into the margins of the foot piece 12 at the juncture of the latter with said leg extension 11. Each plate 10 is also provided around its internal periphery, which defines the opening 15 thereof, with an inwardly projecting annular flange 16 angular to the plane thereof. Extending across the internal angle formed by the junction of the leg extension 11 and the foot piece 12 is an oblique reenforcing rib 17, whereby to reenforce said leg extension and foot piece against relative bending displacement. It will be observed that the provision of the flanges 13 and 16 will strongly stiffen and reenforce each plate 10 against distortion, so that each said plate provides a very rigid and individually strong structure.

Said plate structures are preferably made of non-corrosive sheet metal material, such e. g. as stainless steel, but it will be understood that the same may optionally be made of any other selected and suitable material.

Another component of the novel line guide element comprises a tubular eyelet member 18 which is initially formed at one end only with a curled or rolled external annular bead or head 19. This eyelet member 18 is also made of non-corrosive metallic material, and preferably of stainless steel. The external diameter of the tubular body of said eyelet member 18 corresponds to the diameters of the openings 15 of the perforate plates 10, so as to be capable of being passed through the latter.

In assembling the above described component parts of the line guide element, the perforate plates 10 are aligned with their flanged faces opposed, and then brought together in mutual contact with the margins of their flanges 13 and 16 abutted. When the perforate plates are thus assembled, the tubular eyelet member 18 is passed through the registered openings 15 thereof until the initially formed bead or head 19 abuts the outer face of one said perforate plate 10, whereupon the free end of said tubular eyelet member 18, which protrudes beyond the outer face of the other said perforate plate 10, is curled or rolled to form a second external annular bead or head 20, which is driven home so as to tightly abut the face of said latter perforate plate 10, whereby to draw the perforate plates 10 together in strongly united relation, thus completing the assembly which constitutes the novel line guide element.

Figure 4:
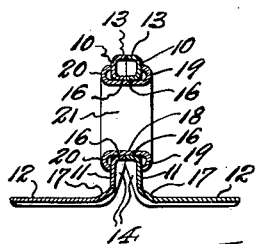
Fig. 4 is a central longitudinal sectional view of the line guide element.
Figure 3:
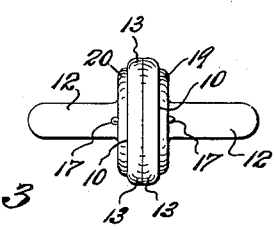
Fig. 3 is a top elevational view of the novel line guide element according to the invention.
Figure 5:
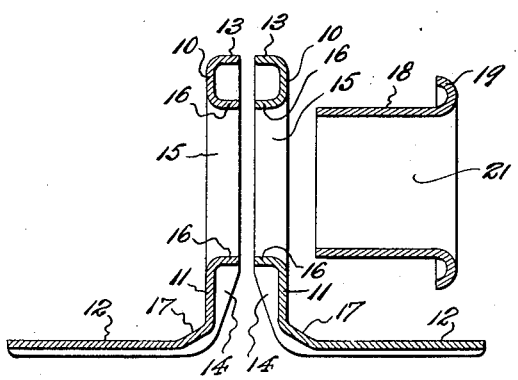
Fig. 5 is a central longitudinal sectional view of the line guide element, showing its parts in disassembled relation, said view being drawn on an enlarged scale.

The initially formed bead 19 of eyelet member 18 and also the second bead 20 formed in the assembly operation preferably have inturned edges, as shown in Figs. 4 and 5. These bead edges are axially facing and so constructed and arranged that they are adapted to abut the outer faces of plates 10 along a circular line substantially midway between the external and internal angular flanges 13 and 16. The portions of beads 19 and 20 adjacent to the inturned edges are spaced from the outer plate faces and thereby deformable in the assembly operation to insure close contact of the edges of said beads throughout their extent with said plate faces. More tightly binding the contact of the eyelet member beads with the abutting plates will be effected than if the bead edges were disposed to face radially outward and if the beads were given the same shape as the outer plate faces for form-fitting contact of the broad surfaces as distinguished from the edge surfaces. Due to the hollow annular form of the plates 10, the outer face portions thereof are similarly deformable to permit the edges of beads 19 and 20 of eyelet member 18 in their biting contact with said face portions to place them under flexional tension. The resulting unitary structure is therefore permanently tensioned for enduring rigid relationship of its component elements.

It will be noted that the tubular eyelet member 18 not only serves to rivet together the perforate plates 10 in rigid and strongly united relation, but also, by reason of the beads or heads 19 and 20, serves to further reenforce said plates against distortion. Furthermore, the tubular eyelet member 18, with its rounded curled or rolled bead or head portions 19 and 20, provides, by its endwise open passage 21, the eye of the line guide element through which a line desired to be guided thereby may be passed for movement back and forth therethrough; and since the margins of the open ends of said eyelet member passage 21 are defined by the curved or rounded surfaces of the curled or rolled beads or heads 19 and 20, all sharp edges are eliminated, and consequently all risk of abrading or other injury and resultant weakening of a line served by the guide element is avoided.

From the above it will be apparent that the novel construction of line guide element according to this invention is of very strong and rigid character, and that its component parts not only mutually reenforce each other in their assembled relation, but the interlocked assembled relation thereof is such that all necessity for use of soldering, brazing or welding materials and operations in the production thereof is avoided.

Being, in the preferred form thereof above described, of all metal construction, the line guide element possesses no parts subject to fracture, loosening or becoming distorted or displaced, and consequently the element is therefore of such character as to assure a long life of efficient service in use.

Having now described my invention, I claim:

1. A line guide element comprising a pair of upstanding perforate plates each having leg extensions, foot pieces respectively unitary with said respective leg extensions to extend angularly outward from ends thereof, each plate having an external rearwardly extending angular flange projecting from exterior peripheral portions thereof and an internal rearwardly extending angular flange projecting from the periphery of the opening thereof, said perforate plates being aligned back to back with said flanges opposed and abutted edgewise throughout their extent and the openings of said plates in register, and a tubular eyelet member extending through said registered openings of the plates, the respective ends of said eyelet member terminating in external annular beads respectively disposed to abut the outer faces of the respective plates, whereby to form therewith a rigid unitary guide element structure.

2. A line guide element as defined in claim 1, wherein the tubular eyelet member has its external annular bead so constructed and arranged as to provide axially inwardly facing edges adapted to abut the outer faces of the respective plates along a circular line substantially midway between the external and internal angular flanges of said plates, whereby deformable portions of the eyelet member beads adjacent to the edges thereof permit close biting contact of said edges throughout their extent with the deformable outer face portions of the respective plates.

WILLIAM M. HOFFMAN.

REFERENCES CITED

The following references are of record in the file of this patent:

UNITED STATES PATENTS

| Number | Name | Date |
|---|---|---|
| 387,545 | Spruce et al. | Aug. 7, 1888 |
| 576,110 | Graves | Feb. 2, 1897 |
| 934,414 | Moran | Sept. 14, 1909 |
| 1,372,900 | Olinger | Mar. 29, 1921 |
| 1,739,368 | Monroe | Dec. 10, 1929 |
| 1,781,569 | Cook | Nov. 11, 1930 |
| 2,293,280 | Covington | Aug. 18, 1942 |